United States Patent Office 3,663,585
Patented May 16, 1972

3,663,585
PROCESS FOR LITHIATING FERROCENE
Arthur W. Langer, Jr., Watchung, N.J., assignor to Esso Research and Engineering Company
No Drawing. Continuation-in-part of application Ser. No. 690,076, Dec. 13, 1967, which is a continuation-in-part of application Ser. No. 560,110, June 24, 1966, which is a continuation-in-part of application Ser. No. 505,976, Nov. 1, 1965, which is a continuation-in-part of application Ser. No. 359,434, Apr. 13, 1964, which in turn is a continuation-in-part of application Ser. No. 266,188, Mar. 19, 1963. This application Aug. 3, 1970, Ser. No. 60,772
Int. Cl. C07f *15/02*
U.S. Cl. 260—439 CY
2 Claims

ABSTRACT OF THE DISCLOSURE

Ferrocene or a derivative thereof is lithiated by reaction, at temperatures in the range 25°–100° C., in a hydrocarbon solvent, with a hydrocarbon lithium, preferably in conjunction with an N,N,N′,N′-tetraalkyl ethylene diamine (I). The products produced in conjunction with (I) tend to have higher degrees of lithiation than those produced in the absence of (I).

---

This invention relates to a method for preparing organolithium amine complexes. More particularly, this invention relates to the preparation of such complexes by admixture of an organolithium with a tertiary chelating polyamine (two or more polyamines may be used if desired) and a hydrocarbon group-containing compound having a pKa of about 40 or less.

This application is a continuation-in-part of application Ser. No. 690,076 filed Dec. 13, 1967, which in turn is a continuation-in-part of application Ser. No. 560,110 filed June 24, 1966 now abandoned as a continuation-in-part of application Ser. No. 505,976 filed Nov. 1, 1965 now abandoned as a continuation-in-part of application Ser. No. 359,434 filed Apr. 13, 1964, U.S. Pat. No. 3,458,586, which in turn is a continuation-in-part of application Ser. No. 266,188 filed Mar. 19, 1963 and now abandoned.

The complexes prepared by the method to be described in detail hereinbelow have several uses. They may serve as catalysts for the homo- or copolymerization of ethylene, diolefins, polar monomers, etc. The complexes are useful as telomerization catalysts whereby, for example, ethylene units may be "grown" onto aromatic hydrocarbons to yield detergent bases and high quality waxes. Moreover, the complexes may be employed as reagents in Grignard-type reactions leading to the preparation of acid, alcohols, ketones, etc.

By the method of this invention, organolithium compounds are produced which contain a tertiary chelating polyamine. The polyamine is so tightly chelated to the lithium that the entire complex acts as a compound. The complex is produced by admixing (reacting) an organolithium with the polyamine and a hydrocarbon group-containing compound having a pKa of about 40 or less (the hydrocarbon group-containing compound will obviously thus have a replaceable hydrogen atom).

The general reaction for this invention is as follows:

R Li + polyamine + R′H ⟶
(organolithium)
R′Li·polyamine + RH
(complex)

The above general reaction may be illustrated with n-butyllithium (C₄H₉Li), N,N,N′,N′ - tetramethylethanediamine (TMEDA) and benzene (ArH):

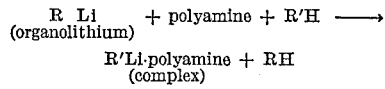

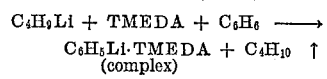

As may be seen from the above equations, the reaction will proceed satisfactorily so long as the hydrocarbon group-containing compound is sufficiently acidic, i.e. having an acidity corresponding to a pKa of about 40 or less. In the general reaction, R′H has greater kinetic or thermodynamic acidity than RH. In the specific reaction, the reaction proceeds satisfactorily because ArH is a stronger protonic acid than $C_4H_{10}$.

The general reaction is known as "metallation" and is analogous to known metallation reactions except for the following aspects: (1) the chelating tertiary polyamine assists in the reaction and combines with the product to produce novel materials; (2) in the absence of the polyamine, organolithiums generally will not react with aromatic, cyclopropyl or other weakly acidic hydrocarbon compounds to produce the desired lithium compounds; (3) the reactions can be carried out in hydrocarbon media rather than polar media so that the new lithium products are obtained in a more useful and less expensive solvent, as well as a more stable solvent, for use in polymerizations, syntheses, etc.; (4) the polyamine is capable of forming a stable chelate complex with lithium which markedly increases the reactivity of the organolithium compounds.

The organolithium of this invention suitably contains from 1 to 15 carbon atoms. Alkyl, cycloalkyl, aryl or aralkyl lithium compounds are all suitable so long as the organo portion of the organolithium forms a weaker acid than the organic compound with which it reacts. Examples include methyllithium, butyllithium, cyclooctyllithium, dodecyllithium, 2-methyl butyllithium, phenyllithium, benzyllithium, sec-butyllithium, allyllithium, and vinyllithium. Secondary and tertiary alkyllithiums are the most reactive compounds. Alkyllithium compounds are preferred, and of these $C_1$–$C_8$ alkyllithiums are more preferred.

The tertiary chelating polyamines may be monomeric or polymeric wherein the monomeric units preferably contain about 3 to about 50 carbon atoms. Suitably, the monomeric units have a structure within the scope of the general formulas:

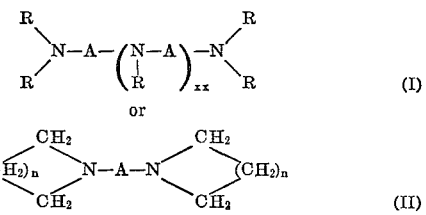

wherein the R radicals are the same or different $C_1$–$C_{10}$ alkyl radicals, preferably at least one R being a methyl radical; $x$ is an integer of 0 to 2 inclusive; $n$ is an integer of 0 to 3 inclusive and A is a non-reactor radical.

For the purposes of this invention, A in the above formulae is selected from the group consisting of: (1) cycloaliphatic and aromatic radicals and their lower alkyl, e.g., $C_1$ to $C_4$, derivatives having ring structures containing 4 to 7 members, wherein said radicals are attached to the nitrogen atoms at 1,2 or 1,3 positions on the rings; suitable examples including N,N,N′,N′-tetramethyl-cis-1,
2-cyclopentanediamine,
N,N,N′,N′-tetramethyl-1,
2-cyclohexanediamine,
N,N,N′,N′-tetramethyl-o-phenylenediamine,
4-ethyl-N,N,N′-,N′-tetramethyl-o-phenylenediamine,
hexamethyl-1,3,5-cyclohexanetriamine,
N,N′,N″-trimethyl-1,3,5-triazine, and the like; (2) a monoethylenic radical, said radical containing 0 to 2 molovalent hydrocarbon radicals of 1 to 8 carbon atoms; suitable examples include N,N,N',N'-tetramethyl-1,2-diaminoethylene,
N,N,N',N'-tetramethyl-3,4-diaminohexane-3, and the like; and (3) 1 to 4 methylenic radicals inclusive, wherein each methylenic radical contains 0 to 2 monovalent hydrocarbon radicals of 1 to 6 carbon atoms; suitable examples include 1,2-dipiperidyl ethane,
N,N'-dimethyl-N,N'-diethyl-1,2-ethanediamine,
N,N,N',N'-tetramethyl-1-cyclohexyl-1,2-ethanediamine,
N,N,N',N'-tetramethyl-1,2-pentanediamine,
N,N,N',N'-tetramethyl-1,2-propanediamine,
N,N,N',N'-tetramethyl-2,3-butanediamine,
N,N,N',N'-tetramethyl-1,4-butanediamine, and the like.

Examples of higher chelating polyamines include N,N,N',N'',N''-pentamethyl diethyltriamine, N,N,N',N'',N''',N'''-hexamethyl triethylene-tetramine, poly(N-ethyl ethylene imine), and the like.

Although the polyamines set forth hereinbelow are particularly preferred insofar as their availability and cost as well as stability of the complex prepared from such amines, care should nevertheless be taken in choosing a polyamine wherein A in the general formulae has an acidity less than that of the hydrocarbon group-containing compound to be employed in the reaction. In other words, the polyamine should be one which itself would not become metallated in preference to the metallation of the hydrocarbon group-containing compound.

Particularly preferred as the chelating tertiary polyamine is the formula shown by (I) above wherein A is defined by either of (1) or (3) above. Suitable examples of these preferred chelating polyamines include:

N,N-dimethyl-N',N'-diethyl-1,2-ethanediamine,
N,N,N',N'-tetramethyl-1,2-ethanediamine,
N,N,N',N'-tetraethyl-1,2-ethanediamine,
N,N,N',N'-tetramethyl-1,3-propanediamine,
N,N,N',N'-tetramethyl-1,2-propanediamine,
N,N,N',N'-tetramethyl-1,4-butanediamine,
N,N,N',N'-tetramethyl-1,2-cyclohexane diamine, and the like. Most particularly preferred herein are N,N,N',N' - tetramethyl - 1,2 - ethanediamine, hereinafter referred to as TMEDA, and N,N,N',N' - tetramethyl-1,2-cyclohexane diamine, hereinafter referred to as TMCHDA.

The hydrocarbon group-containing compound employed in the process is one which has a pKa of about 40 or less on the MSAD pKa scale. Some organic compounds having such a pKa are shown on p. 19, Table XIV of "Fundamentals of Carbanion Chemistry," D. J. Cram, Academic Press, New York, 1965. Particularly preferred are the hydrocarbons having pKa between about 15 and 40.

In general, the useful hydrocarbon group-containing compounds will be those monomers or polymers whose monomeric units have the general formulas:

$$(R'H)_a Z_b (R'')_c \text{ or } (R'')_c Z_b (CH_3)_d \text{ or } R'''H$$

wherein R' is a $C_6$–$C_{30}$ hydrocarbon radical and the hydrogen attached to R' is an aromatic, benzylic or allylic hydrogen atom; Z is oxygen, nitrogen, phosphorus, silicon or sulfur; R'' is hydrogen or a $C_1$–$C_{30}$ hydrocarbon radical such as alkyl, aryl, aralkyl, cycloalkyl, etc.; R''' is a methyl radical, $C_3$–$C_{23}$ cyclopropyl radical or a $C_6$–$C_{30}$ hydrocarbon radical containing at least one aromatic hydrogen atom; benzylic hydrogen atom, acetylenic hydrogen atom or allylic hydrogen atom; $b$ is an integer representing the valence of Z; $a$ and $c$ are integers whose sum is equal to the value of $b$; $d$ is an integer of at least 1; and the sum of $c$ and $d$ is equal to the value of $b$.

Representative examples of the useful compounds are (a) alcohols such as phenol, benzyl alcohol, methanol, isopropanol, t-butanol, etc.; (b) ethers such as methyl phenyl ether (anisole), diphenyl ether, p-tolyl butyl ether, benzyl ethyl ether, allyl ethyl ether, propenyl propyl ether, dibenzofuran, cyclohexyl methyl ether, etc.; (c) primary, secondary and tertiary amines such as 4-ethyl-N,N,N',N'-tetramethyl-o-phenylenediamine, 2,5-dimethylpyridine, N,N-diethyl aniline, tirmethyl amine, methyl dibutyl amine, N-methyl piperidine, diphenyl amine, diethyl amine, piperidine, etc.; (d) primary, secondary and tertiary phosphines such as butyl phosphine, diphenyl phosphine, dimethyl phosphine, trimethyl phosphine, diethyl phenyl phosphine, diphenyl methyl phosphine, etc.; (e) silanes such as trimethyl silane, tetramethyl silane, triphenylmethyl silane, etc.; (f) mercaptans and sulfides such as methyl mercaptan, phenyl mercaptan, benzyl mercaptan, methyl sulfide, allyl propyl sulfide, phenyl ethyl sulfide, cyclohexyl methyl sulfide, etc.; (g) unsaturated hydrocarbons such as propylene, pentene-1, pentene-2, butene-2, octene-1, octene-2, allylbenzene, butenylbenzene, 1,5-hexadiene, acetylene, hexyne-1, etc.; (h) polymers such as polybutadiene, polystyrene, polyisoprene, styrene-isobutylene copolymers, butyl rubber, etc.; and (i) hydrocarbons such as benzene, naphthalene, diphenyl, fluorene, toluene, xylene, methane, triphenyl methane, thiophene, dibenzene chromium, ferrocene or a hydrocarbon-substituted ferrocene containing up to three hydrocarbon groups replacing hydrogen on the rings, cyclopropane and $C_1$–$C_{20}$ alkylated or cycloalkylated cyclopropanes containing at least four hydrogen atoms on the ring, e.g. octylcyclopropane, 1,1-dimethyl-cyclopropane, 1-ethyl-2-propyl-cyclopropane, etc.

The hydrocarbon group-containing compound of choice may be any one of those having the requisite pKa set forth above. However, it is preferred that the organic compound not contain any conjugated double bonds, allenic bonds or acetylenic bonds since these compounds may undergo side reactions rather than or in addition to the metallation reaction. These compounds are all metallated at their most acidic position to yield the corresponding hydrocarbon lithium chelating polyamine complex. Thus, for example, hydrocarbons having aromatic benzylic or allylic hydrogen would produce complexes in which the lithium atom is attached to the aromatic nucleus, benzylic position or allylic position. The resultant complexes (which in many cases are crystalline in nature) may be used in the form of the reaction mixture or it may be recovered from the reaction mixture at temperatures in the range of $-100°$ to $+50°$ C. depending on stability; conventional recovery methods may be employed, e.g. crystallization, distillation, addition of non-reactive non-solvents, etc.

The preparation of the complex (i.e. the metallation reaction) is effected in the liquid phase at temperatures of about $-100°$ C. to about $+200°$ C., preferably $-50°$ C. to $+50°$ C., and more preferably in a range of 60° to 100° C. especially when lithiating ferrocene or hydrocarbon-substituted ferrocene by merely admixing the organolithium tertiary chelating polyamine and the hydrocarbon group-containing compound; the reaction time is generally short and the complete reaction usually occurs within about 1 minute to about 4 hours, although up to several days may be required in some cases when the metallation driving force is small.

If desired, the metallation reaction may be effected in a hydrocarbon diluent which is not reactive with the components, e.g. a $C_5$–$C_{10}$ alkane or cycloalkane such as hexane, heptane, cyclohexane, etc. Alternatively, extraneous diluents need not be used and an excess of the hydrocarbon group-containing compound itself may be employed as the diluent. With strongly acidic compounds, stoichiometric amounts of the compound (i.e. at 1:1 molar ratio of compound to organolithium) may be used. With weakly acidic compounds, the compound is employed preferably in excess of the stoichiometric amount, based on the organolithium compound, thereby fostering the completeness of the metallation reaction.

The proportions of the organolithium and polyamine are not critical to the invention as, for example, even very minor amounts of the chelating polyamine have been found to be operative however, it is preferred that approximately equimolar proportions of the reactants be used. The molar proportions of organolithium to chelating polyamine are in the range of 100:1 to 1:10, preferably 10:1 to 1:4, and most preferably in the same molar proportions as in the desired product composition.

Organolithium compounds can be prepared conveniently by other novel methods which are not the subject of this invention. For example, they may be prepared by reacting an organo halide, such as vinyl chloride or phenyl chloride with lithium, in the presence or absence of sodium, in a non-reactive hydrocarbon such as heptane solvent in the presence of the chelating base of this invention. Alternatively, an organic halide such as phenyl chloride, may be reacted with sodium metal and a lithium halide in a non-reactive hydrocarbon diluent such as heptane in the presence of the chelating base.

It has also been discovered that the hydrocarbon group-containing compound may be a halide. In this case, metallation occurs by abstraction of hydrogen from the carbon atom attached to the halogen atom. Suitable halides are fluorides, chlorides, bromides and iodides wherein the hydrocarbon group may be alkyl, aralkyl, cycloalkyl, vinyl, alkenyl, aryl, etc. With aryl halides, metallation occurs predominantly ortho to the halide but side reactions involving the C—Cl bond also occur.

This invention can be more fully understood by reference to the following examples. In these examples, the term TMEDA signifies N,N,N'N'-tetramethylethylenediamine (N,N,N',N'-tetramethyl-1,2-ethanediamine). The term BuLi signifies butyllithium.

EXAMPLE 1

It is well known in the art that butyllithium does not react with benzene up to about 100° C. and mixtures can be stored indefinitely at room temperature without any significant reaction. However, when an equimolar amount of N,N,N',N' - tetramethylenediamine (TMEDA) was added to a solution of butyllithium in benzene, butane was evolved quantitatively at 25° C. in less than two hours and NMR analysis showed complete loss of the butyl carbanion.

In order to prove that the new lithium product was phenyl lithium, the following reaction was carried out. A benzene solution containing 10 mmol BuLi and 10 mmol TMEDA was heated one hour at 60° C., cooled to 10° C., and a solution of 3.3 mmol $PCl_3$ in 10 ml. benzene was added. After 15 minutes at 50° C., alcohol was added to kill unreacted lithium compounds, LiCl was removed by filtration, and the product was isolated by removing solvent on a steam bath. A 92% yield of crude triphenylphosphine was obtained contaminated with some triphenylphosphine oxide. After oxidation with 3% $H_2O_2$, the product was shown to have an infrared pattern identical to that of authentic triphenyl phosphine oxide. Therefore, the BuLi-TMEDA-benzene solution consisted solely of phenyllithium activated by TMEDA.

EXAMPLE 2

Benzyllithium·TMEDA was prepared by reacting 2 ml. toluene (18 mmol) with 5 mmoles butyllithium·TMEDA in 5 ml. n-heptane at 25° C. for 15 hours. A solid mass of yellow needles was filtered, washed with heptane and vacuum dried. Yield=0.63 g. (theory=1.07 g.). Losses were due to solubility in heptane as shown by carbonation of the filtrate which yielded 0.20 g. phenylacetic acid, identified by M.P. 73.4° C. (lit. M.P. 76.7° C.) and infrared spectrum. Recovery of 90% of the theoretical yield indicates that reaction was essentially quantitative.

The benzyllithium·TMEDA crystals melted at 70–72° C. (capillary at 1° C./min.). Analysis: 3.28% Li (calc. 3.24). Complete characterization was done by NMR analysis.

When butyllithium·TMEDA was prepared in toluene solvent, the reaction to form benzyllithium·TMEDA was shown by NMR to be completed in less than 15 minutes at 25° C. Since the benzyllithium TMEDA complex undergoes similar reactions to pure benzyllithium and the complex is much more reactive, this synthesis is far superior in speed, simplicity, raw material costs, yield and convenience to the best prior synthesis (H. Gilman and G. L. Schwebke; J. Org. Chem., 27, 4259 (1962).

EXAMPLE 3

Diphenylmethyllithium·TMEDA was prepared by mixing 0.04 mole each of diphenylmethane, butyllithium, and TMEDA in about 60 ml. n-heptane at 25–30° C. for one hour. A red-orange oil separated, the upper phase was discarded, the oil was washed twice with heptane to remove any unreacted starting materials and then vacuum dried. Crystallization occurred during drying. Yield was 11.1 g. (theory=11.6 g.), indicating quantitative reaction. Analysis: 9.31% N (calc. 9.64); 57.0% diphenylmethyl group by quantitative ultraviolet spectroscopy (calc. 57.5).

EXAMPLE 4

Triphenylmethyllithium·TMEDA was prepared in a manner similar to Example 3, except that a mixture of toluene and heptane was used as solvent. A quantitative yield of red-orange crystals was isolated and analyzed without further purification.

|  | Weight percent | Calculated |
|---|---|---|
| C | 81.65 | 81.93 |
| H | 8.19 | 8.53 |
| N | 7.53 | 7.65 |
| Li |  | 1.89 |
| Total |  | 100.00 |

EXAMPLE 5

With the aryllithium compounds, in particular, it was found that more than one mole of chelating polyamine could combine to form complexes which are stable under vacuum at room temperature. These complexes may contain varying amounts of complexing agent up to about two moles per mole of aryllithium. Although the art has only known complexes in which the base complexes to the lithium, these higher complexes appear to have the second mole of base solvating the aryl group rather than the lithium. Consequently, they represent a new class of stable complexes.

Preparation of triphenylmethyllithium complexed to approximately two TMEDA molecules can be illustrated two ways:

(a) The 1:1 triphenylmethyllithium·TMEDA complex was prepared and isolated as in Example 4; 1.60 g. (0.0044 mole) was dissolved in 10 ml. toluene and 0.66 ml. (about 0.51 g.) pure TMEDA (0.0044 mole) was added. The new crystalline complex precipitated immediately. After decanting the liquid and washing the solid with heptane, the dark orange-red crystals were vacuum dried to constant weight. Yield was 1.87 g., which is 89% of theory for triphenylmethyllithium·2 TMEDA. Analysis: 11.49% N (calc. 11.6).

(b) An approximate 1:2 complex was prepared directly following the procedure of Example 4, except for the proportions. 0.489 g. triphenylmethane (0.002 mole), 3 ml. benzene, 1 ml. 2 M BuLi in heptane (0.002 mole) and 2 ml. 2 M TMEDA in heptane (0.004 mole) were mixed and allowed to stand two days at 25° C. A dark red oil separated and crystallized. The crystals were filtered, washed with 5 ml. heptane and then vacuum dried. Yield of crystals was 0.845 g. Including product recovered from filtrate (0.067 g.), the recovery was 0.912 g. (theory=0.965 g.). Analysis: 9.54% N (calc. 11.6%).

In a similar manner, complexes containing more than one and less than two moles of chelating polyamine per mole of aryllithium are prepared by using the proper proportions in the above procedures since such products are merely mixtures of the 1:1 and 1:2 complexes.

EXAMPLE 6

Various aromatic compounds were metallated according to Example 3, using an appropriate solvent (heptane, benzene or toluene) and convenient reaction times up to 24 hours at room temperature. The following compounds were metallated: diphenyl, naphthalene, beta-methylnaphthalene and fluorene. Carbonation of the aryllithium·TMEDA compounds produced the various aryl carboxylic acids.

EXAMPLE 7

The heterocyclic compounds pyridine and betapicoline were metallated in benzene or heptane solvent at −20° C. to +50° C. for 15–60 minutes. Phenyllithium·TMEDA was used as metallating agent instead of butyllithium·TMEDA in order to minimize side reactions which might occur from using a more active reagent. Carbonation produced carboxylic acids derived from the heterocyclic compounds.

EXAMPLE 8

Naphthyllithium·TMEDA was prepared by (a) dissolving 2 mmoles phenyllithium·TMEDA (0.40 g.) in 5 ml. benzene, (b) adding 2 mmoles (0.256 g.) naphthalene in 5 ml. benzene, and (c) allowing the solution to stand overnight at 25° C. The clear yellow solution was evaporated to dryness under vacuum to obtain the solid naphthyllithium·TMEDA. Yield was 0.52 g. (theory= 0.500 g.). Analysis: 11.2% (calc. 11.2).

EXAMPLE 9

Ferrocenyllithium·TMEDA was prepared by dissolving 0.744 g. ferrocene (0.004 mole) in 20 ml. benzene solution and adding 2 M stock solutions containing 0.004 mole each of butyllithium and TMEDA. A deep orange solution was obtained and was allowed to stand two hours at room temperature. The solution was evaporated to dryness under high vacuum, yielding 1.26 g. golden crystals (theory 1.23 g.).

EXAMPLE 10

Ferrocenyl (lithium)$_2$/TMEDA was prepared according to Example 9, except that only 0.372 g. ferrocene (0.002 mole) was used and the metallation was carried out in heptane solvent at 75° C. for one hour. The turbid orange solution was vacuum dried yielding 0.572 g. orange powder (calc. 0.628 g.). Carbonation of 0.522 g., acidification, ether extraction to remove some ferrocene monocarboxylic acid, and vacuum drying the ether insoluble fraction yielded 0.22 g. ferrocene dicarboxylic acid. Analysis: 24.8% O (calc. 23.4).

EXAMPLE 11

Para-t-butylbenzyllithium·TMEDA was prepared by metallating 3 mmoles p-t-butyltoluene with 2 mmoles BuLi·TMEDA in 8 ml. n-heptane at 50–60° C. for three hours. Vacuum drying the total mixture gave an orange viscous oil which crystallized upon standing. Yield was 0.47 g. (calc. 0.54 g.). Carbonation yielded p-t-butylphenylacetic acid, identified by infrared analysis. In a similar manner, t-butylbenzene is metallated on the ring, yielding t-butylphenyllithium·TMEDA. These compounds are more reactive than either benzyllithium·TMEDA or phenyllithium·TMEDA by virtue of the electron releasing ability of the tertiary butyl group. They will, in fact, metallate benzene or toluene rapidly when added to these solvents. Because of the lower acidity of the hydrogen in t-butylbenzene, metallation on the ring has only been accomplished previously using sodium or potassium alkyls yielding compounds which have only limited use in organic syntheses. Therefore, this invention makes readily available for the first time the lithiated derivatives which are of much greater utility in Grignard-type reactions, catalysis, etc.

EXAMPLE 12

Deuterophenyllithium·TMEDA was prepared according to Example 1. Characterization was accomplished by NMR analysis which showed that the chemical shifts of the TMEDA hydrogens were identical to those of phenyllithium·TMEDA. Thus, this invention makes available the most convenient, low cost synthesis of a deuterophenyllithium compound for use in preparing deuterophenyl derivatives. Obviously, other deuterated compounds can be lithiated for use in various syntheses provided that the compound contains at least one hydrogen sufficiently acidic to be metallated by an organolithium·chelating polyamine.

EXAMPLE 13

Metallations can also be carried out in the presence of only catalytic amounts of the chelating polyamine. This may be desirable to reduce the costs or to use the organometallic compound for reactions in which the polyamine may be undesirable. Removal of the chelating base from the organolithium compound can also be done by using other complexing agents. Thus, one can benefit from the facile metallation reaction in the presence of chelating polyamine and then isolate the organolithium compound substantially free of base. The chelating polyamine may be displaced from the complex by compounds, such as lithium salts, or it may be extracted from the complex by adding Lewis acids which form stronger complexes than does lithium. The following experiments demonstrate these features:

(A) 6 ml. toluene, 5 ml. 1 M BuLi in n-heptane (0.005 mole) and 1 ml. 2 M TMEDA (0.002 mole) were mixed and allowed to stand under nitrogen at 25° C. for three days. Evaporation to dryness yielded 0.68 g. yellow solid (theory is 0.723 g. for 3 mmole benzyllithium+2 mmoles benzyllithium·TMEDA). Analysis: 7.99% N (calc. 7.75); 51.5% benzyl group (by U.V.) (calc. 62.8). Therefore, a 78% yield of benzyllithium was obtained using only 40% TMEDA based on butyllithium.

(B) A solution of 5 mmoles butyllithium and 0.2 mmole TMEDA in 5 ml. benzene was allowed to stand four days, then heated to 50° C. for 2½ hours. Work-up and analysis as in (A) showed that 5.2 moles of phenyllithuim were obtained per mole of TMEDA.

(C) A solution of 5 mmoles butyllithium and 1 mmole TMEDA in 10 ml. toluene was heated to 75° C. for three hours to convert it to 5 benzyllithium+1 TMEDA. A slurry of finely ground anhydrous lithium bromide (1 mmole) in 10 ml. toluene was added and stirred one hour at 75° C. After cooling, the solid was filtered and vacuum dried and the filtrate was evaporated. Analysis showed that the solid contained 12 benzyllithium per TMEDA whereas the filtrate contained 3.5 moles/mole TMEDA. Therefore, the LiBr displaced TMEDA from the benzyllithium·TMEDA complex which originally had a 5 to 1 mole ratio.

(D) To a solution of 0.98 g. (4 mmoles) triphenylmethane in 5 ml. toluene was added 4 ml. 1 M tert.-BuLi (4 mmoles) and 1 ml. 1 M TMEDA (1 mmole). After 15 minutes at 25° C., the solution was heated to 50–60° C. for one hour, yielding a heavy red oil. Repeated vacuum drying yielded 1.20 g. orange-red crystals (calcd. for [(C$_6$H$_5$)$_3$CLi]$_4$·TMEDA=1.12 g.). Analysis: 2.43% N (calc. 2.51). The product was characterized by reaction with ClSi(CH$_3$)$_3$ to yield (C$_6$H$_5$)$_3$C-Si(CH$_3$)$_3$.

(E) The procedure of (D) was repeated except that the amount of TMEDA was doubled. The yield of red crystals of [(C$_6$H$_5$)$_3$CLi]$_2$·TMEDA was 1.31 g. (calc. 1.33 g.). Analysis: 4.54% N (calc. 4.54).

EXAMPLE 14

Following the procedure of Example 6, the xylene isomers were metallated to produce the corresponding xylyllithium·TMEDA compounds. The product from p-xylene was obtained as pale yellow needle crystals, whereas that from m-xylene was a viscous red-brown oil.

EXAMPLE 15

Following the procedure of Example 1, benzene was metallated using sec-butyllithium·TMEDA and t-butyllithium·TMEDA at 25° C. Reaction occurred more rapidly than with n-butyllithium·TMEDA and appeared to be complete in less than 30 minutes to produce phenyllithium·TMEDA. Therefore, the secondary and tertiary alkyllithium complexes with chelating polyamines may be used to achieve more rapid metallations or to accomplish metallation of compounds which are appreciably less acidic than benzene.

Various chelating polyamines may be used in place of TMEDA to activate organolithium compounds for metallation of aromatics to produce the corresponding aryllithium chelating polyamine compounds. Examples include N,N,N',N'-tetramethyl-1,3-propane diamine,
N,N,N',N'-tetramethyl-1,2-propane diamine,
N,N-diethy-N',N'-dimethylethylenediamine,
N-methyl-N,N',N'-triethylethylenediamine,
N,N,N',N'-tetraethylethylenediamine,
N,N,N',N'-tetramethyl-1,2-cyclohexanediamine,
poly(N-methyl ethylenimine) and
poly(N-butyl ethylenimine).

EXAMPLE 16

The criticality of chelating polyamines compared to non-chelating types was shown in the metallation of benzene with BuLi. To 10 ml. benzene was added 2 mmoles BuLi and 2 mmoles ditertiary amine. After 20 hours at room temperature, the extent of benzene metallation was determined by carbonation and isolation of the benzoic acid. The data in the table below show that chelating polyamines, which can form ring structures having 4–7 members, promoted metallation, whereas tetramethyl-1,6-hexanediamine (TMEDA), which does not chelate and acts like a monofunctional amine, was inactive. The 5 and 6 membered ring structures were by far the most effective.

Metallation of Benzene with BuLi Ditertiary Amines

| Ditertiary amine | Ring size | Percent metalla-tiln |
|---|---|---|
| $(CH_3)_2N(CH_2)_1N(CH_3)_2$ | 4 | 5 |
| $(CH_3)_2N(CH_2)_2N(CH_3)_2$ | 5 | [1] >90 |
| $(CH_3)_2N(CH_2)_2N(C_2H_5)_2$ | 5 | [1] >90 |
| $(C_2H_5)_2N(CH_2)_2N(C_2H_5)_2$ | 5 | [1] >90 |
| $(CH_3)_2N(CH_2)_3N(CH_3)_2$ | 6 | [1] >90 |
| $(CH_3)_2N(CH_2)_4N(CH_3)_2$ | 7 | 15 |
| $(CH_3)_2N(CH_2)_6N(CH_3)_2$ | 9 | [2] 1 |

[1] Probable quantitative metallations if allowances are made for incomplete carbonation and recovery of benzoic acid.
[2] Only a trace of solid was obtained which was not identified.

EXAMPLE 17

Cyclopropane was metallated using butyllithium·TMEDA to produce cyclopropyllithium·TMEDA. Reaction was accomplished by adding 10 mmoles butyllithium·TMEDA to 100 ml. n-heptane saturated with cyclopropane at room temperature. After standing three days at room temperature, the yellow solution containing cyclopropyllithium·TMEDA was carbonated, acidified and extrated with ether. The ether solution was evaporated, yielding 0.26 g. (3 mmoles) cyclopropane carboxylic acid, a pale yellow oil.

Conventional processes for making cyclopropyllithium (in the absence of a chelating polyamine) require cyclopropyl halides as a starting material, and these conventional processes are much more costly and less convenient.

EXAMPLE 18

In a series of experiments, t-butanol, piperidine, diphenylamine and trimethylamine were metallated with BuLi·TMEDA to obtain the chelated lithium salts for use as polymerization catalysts.

Mixing 2 mmoles each of t-butanol and BuLi·TMEDA in 10 ml. benzene resulted in immediate reaction to form a solution of TMEDA·LiO-t-Bu.

Mixing 2 mmoles of piperidine and BuLi·TMEDA in 20 ml. xylene and heating to 60° C. for 15 minutes gave a pale yellow solution of TMEDA·Li-piperidine.

Mixing 4 mmoles each of diphenylamine and BuLi·TMEDA in 10 ml. xylene at 50° C. for 15 minutes yielded a solution of TMEDA·LiN $(C_6H_5)_2$.

Trimethylamine (132 g.) was reacted at 60–100° C. with 24 mmoles BuLi, 12 mmoles TMEDA and 6 mmoles PMDT (N,N,N',N",N"-pentamethyldiethylenetriamine) in 150 ml. n-heptane and in the presence of 700–1000 p.s.i.g. ethylene for nearly 4 hours. Liquid and solid telomers of trimethylamine and ethylene were obtained, showing that metallation of trimethylamine occurred and that the resulting TMEDA·LiCH$_2$N(CH$_3$)$_2$ was active for polymerizing ethylene.

EXAMPLE 19

Piperidine (2 mmoles) in 10 ml. n-heptane was metallated with 2 mmoles BuLi+2 mmoles PMDT at 25° C. for a few minutes. The slightly cloudy solution was evaporated to dryness, yielding 0.436 g. light yellow crystals (82% yield) of PMDT·Li-piperidine. Analysis: 20.9% N (calc. 21.2).

EXAMPLE 20

In identical experiments, t-butanol and n-butanol were reacted with equimolar amounts of BuLi·TMCHDA (TMCHDA is N,N,N',N'-tetramethyl-1,2-cyclohexanediamine which in this case was predominantly the trans isomer) in heptane and the metallation products were isolated as soft white solids.

| | Percent yield | Percent nitrogen | |
| | | Found | Calculated |
|---|---|---|---|
| TMCHDA-Li-O-t-Bu | 83 | 11.8 | 11.2 |
| TMCHDA-Li-O-n-Bu | 84 | 11.1 | 11.2 |

Reaction of TMCHDA·Li-O-t-Bu with ClSi(CH$_3$)$_3$ produced the expected t-BuOSi(CH$_3$)$_3$.

EXAMPLE 21

Ethyl methyl sulfide was metallated with an equimolar amount of BuLi·TMEDA in heptane+cyclohexane solution at 25° C. Reaction was followed by NMR during several days and the product identified as TMEDA·LiCH$_2$SC$_2$H$_5$.

EXAMPLE 22

To tetramethyl silane (1 ml.) in 20 ml. heptane at 30° C. was added 4 mmoles t-BuLi and then 4 mmoles TMEDA. After warming to 25° C. for 1 hour, the solution was vacuum dried, yielding 0.723 g. clear orange oil. NMR analysis showed 80% TMEDA·LiCH$_2$Si(CH$_3$)$_3$ and 20% LiN(CH$_3$)$_2$ by-product.

A sample of TMEDA·LiCH$_2$Si(CH$_3$)$_3$ was carbonated and (CH$_3$)$_3$SiCH$_2$COOH was identified. Other samples were added to benzene and toluene and the reactions were followed by NMR for one week. The benzene solution gave 90% reaction to TMEDA·LiC$_6$H$_5$+(CH$_3$)$_4$Si. The complex reacted quantitatively with toluene to produce TMEDA·LiCH$_2$C$_6$H$_5$.

EXAMPLE 23

A mixture of 3 mmoles BuLi and 1 mmole N,N',N"-trimethyl-s-triazine reacted with diphenylmethane to yield the red diphenylmethyllithium.

EXAMPLE 24

Olefins were metallated at allylic C–H positions. A saturated solution of butene-2 in 25 ml. n-heptane was reacted with 10 mmoles BuLi·TMEDA in 15 ml. heptane for 24 hours. A viscous red oil (1.07 g.) was isolated and butenyllithium was identified by NMR.

A solution of 10 ml. pentene-2 in 25 ml. heptane was reacted in the same manner with 10 mmoles BuLi·TMEDA and the pentenyllithium/TMEDA was isolated as a yellow semi-solid. Identification was made by NMR and carbonation to produce the unsaturated acid.

Octene-1 (excess) was reacted with BuLi·TMEDA at 50–80° C. for 3 hours. The metallated product was carbonated and the acid isolated in the usual way. The acid was obtained as a light yellow oil. Infrared analysis showed only internal unsaturation, proving that the substituted allyl ion carbonated at the terminal carbon rather than carbon three, thereby yielding the linear acid derived from the isomerization product (octene-2).

EXAMPLE 25

Acetylene and monosubstituted actylenes were metallated at the acetylenic C–H position. In two experiments, hexyne-1 (2 mmoles) was reacted with 2 mmoles BuLi·PMDT and with 2 mmoles BuLi·trans-TMCHDA. Immediate reaction occurred and the products were isolated by removing solvent. Hexynyl Li·PMDT was isolated as a very light yellow viscous oil in 95% yield. Hexynyl Li·trans-TMCHDA was obtained as a white paste in 90% yield.

EXAMPLE 26

Metallation of polymers takes place in an identical manner to the metallation of small molecules; i.e., the most acidic positions will be metallated most rapidly. Therefore, polymers containing aromatic, benzylic, allylic, N—$CH_3$, etc., groups are metallated to produce the corresponding polymer-Li·chelate structures. However, with polymers it is possible to obtain polymetallated molecules, whereas most small molecules are metallated more than once only with great difficulty. For example, polystyrene contains benzylic and aromatic hydrogens and undergoes metallation similar to cumene; polyisoprene contains allylic hydrogens and metallates similar to 3-methylhexene-3; styrene-butadiene rubber (SBR) contains benzylic, aromatic and allylic hydrogens and can be metallated readily; poly (N-methyl ethylenimine) can be metallated at the N—$CH_3$ groups similar to trimethylamine.

The metallation of polymers can be illustrated using butyl rubber, a copolymer of isobutylene and isoprene, which contains sufficiently acidic allylic hydrogens. The butyl rubber had a viscosity average molecular weight of 557,000 and 1.9 mole percent unsaturation. A solution of 20 g. butyl rubber in 200 ml. dry, degassed n-hexane was prepared. The BuLi·TMEDA complex (8.9 mmoles) was prepared in 25 ml. n-hexane and, after 30 minutes at 25° C., it was added to the butyl rubber solution. Metallation was allowed to proceed for one week at room temperature. The metallated polymer was carbonated by bubbling dry, oxygen-free carbon dioxide through the solution. As carbonation took place, the polymer solution increased in viscosity and finally gelled. The $CO_2$-saturated solution was allowed to stand 3 days. The solution was washed with 10% aqueous HCl, and the polymer was precipitated with acetone and vacuum dried, yielding 20 g. product. The product was purified by dissolving in hexane, extracting 5 times with aqueous HCl, water-washing until the washings were neutral, precipitating with acetone, and vacuum drying. A 95% recovery of carboxylated polymer was obtained, which analyzed 2.3% oxygen by neutron activation.

This invention has been described in connection with certain specific embodiments thereof; however, these are offered merely as illustrations and it is not intended that the scope of the invention be thereby limited.

What is claimed is:

1. Process of lithiating ferrocene or hydrocarbon-substituted ferrocene wherein a hydrocarbon lithium containing up to 40 carbon atoms is reacted with ferrocene or a hydrocarbon-substituted ferrocene containing up to three hydrocarbon groups replacing hydrogens on the rings, each hydrocarbon group containing up to 10 carbon atoms, said reaction being conducted in a hydrocarbon medium at temperatures in the range of 60° to 100°, C., and being carried out in admixture with an N,N,N',N'-tetraalkyl ethylene diamine in which the alkyl groups each contain from one to ten carbon atoms, the ratio of the hydrocarbon lithium:N,N,N',N'-tetraalkyl ethylene diamine being from 10:1 to 1:4.

2. Process according to claim 1, wherein the N,N,N',N'-tetraalkyl ethylene diamine is N,N,N',N'-tetramethyl ethylene diamine.

References Cited

UNITED STATES PATENTS 3,509,188   4/1970   Halasa et al. _____ 260—439

OTHER REFERENCES

Rausch et al.: J. Orgmet. Chem., 10 (1967) pp. 127–136.

TOBIAS E. LEVOW, Primary Examiner

A. P. DEMERS, Assistant Examiner

U.S. Cl. X.R.

260—241, 248 R, 269, 313.1, 448.2 R, 563 R, 606.5 P, 607 R, 611 R, 617 R, 665 R